United States Patent [19]

Levy et al.

[11] Patent Number: 4,577,067

[45] Date of Patent: Mar. 18, 1986

[54] REMOTELY CONTROLLED TELEPHONE HOLD PROGRAM SYSTEM

[76] Inventors: Alfred Levy, 12 Oak Hill Dr., Oyster Bay, N.Y. 11771; Jon D. Paul, 2800 Third St., San Francisco, Calif. 94107

[21] Appl. No.: 538,820

[22] Filed: Oct. 5, 1983

[51] Int. Cl.[4] .................. H04M 11/08; H04M 3/42
[52] U.S. Cl. ................ 179/99 H; 179/6.08; 179/6.11; 179/2 A; 179/18 B
[58] Field of Search ............ 179/6.07, 6.08, 6.10, 179/6.11, 5 P, 99 H, 99 M, 99 P, 84 R, 84 T, 81 R, 18 B, 18 BE, 18 BF, 2 A

[56] References Cited

U.S. PATENT DOCUMENTS

| | | | |
|---|---|---|---|
| 4,071,698 | 1/1978 | Barger, Jr. et al. | 179/2 R |
| 4,243,844 | 1/1981 | Waldman | 179/81 R |
| 4,376,875 | 3/1983 | Beirne | 179/18 B |
| 4,420,656 | 12/1983 | Freeman | 179/6.04 |
| 4,468,528 | 8/1984 | Reece et al. | 179/18 B |
| 4,517,410 | 5/1985 | Williams et al. | 179/6.04 |

Primary Examiner—Gene Z. Rubinson
Assistant Examiner—Elio DiVito
Attorney, Agent, or Firm—Philip Young

[57] ABSTRACT

A system for providing remote program selection by a held caller in a telephone hold program system wherein a caller's line is connected to a holding circuit and a program is transmitted to the held caller. When a line is being held by the holding circuit, a hold detector causes an announcement to be coupled to the held line for instructing the held caller for remotely selecting one of a plurality of programs. The held caller sends select signals, in the form of voice or tone data, which are decoded and used to select the desired program source to be coupled to the held line. The system includes a remote volume control wherein a command signal sent by the held caller controls the volume level of the program supplied.

31 Claims, 13 Drawing Figures

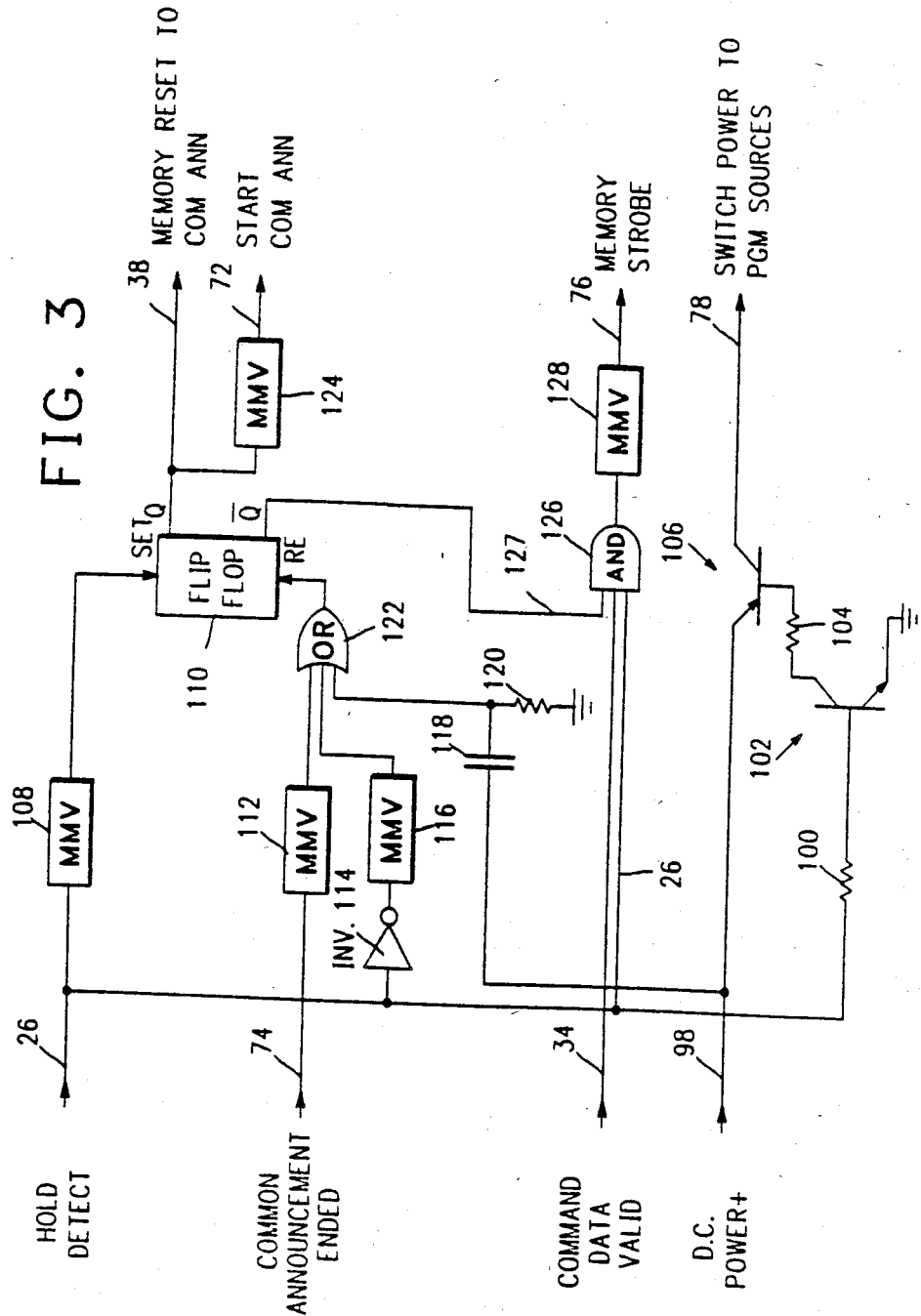

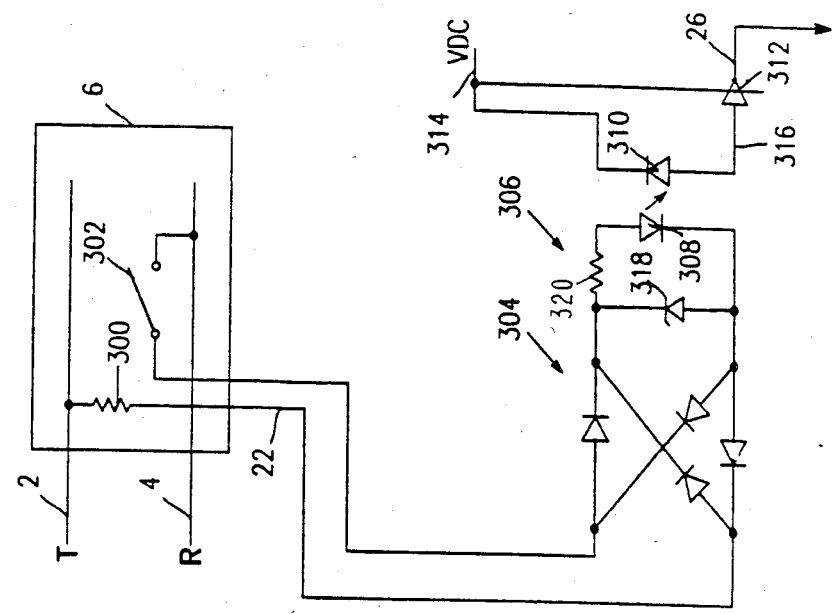
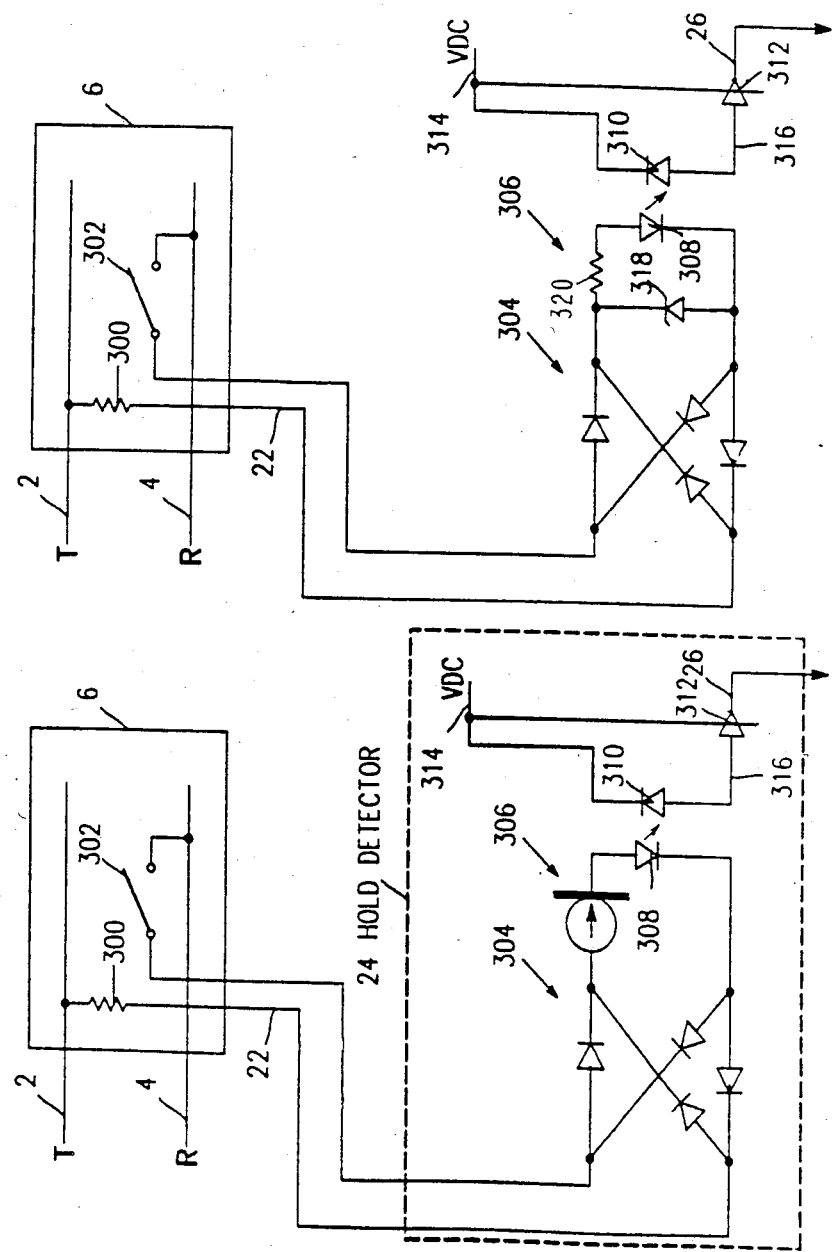

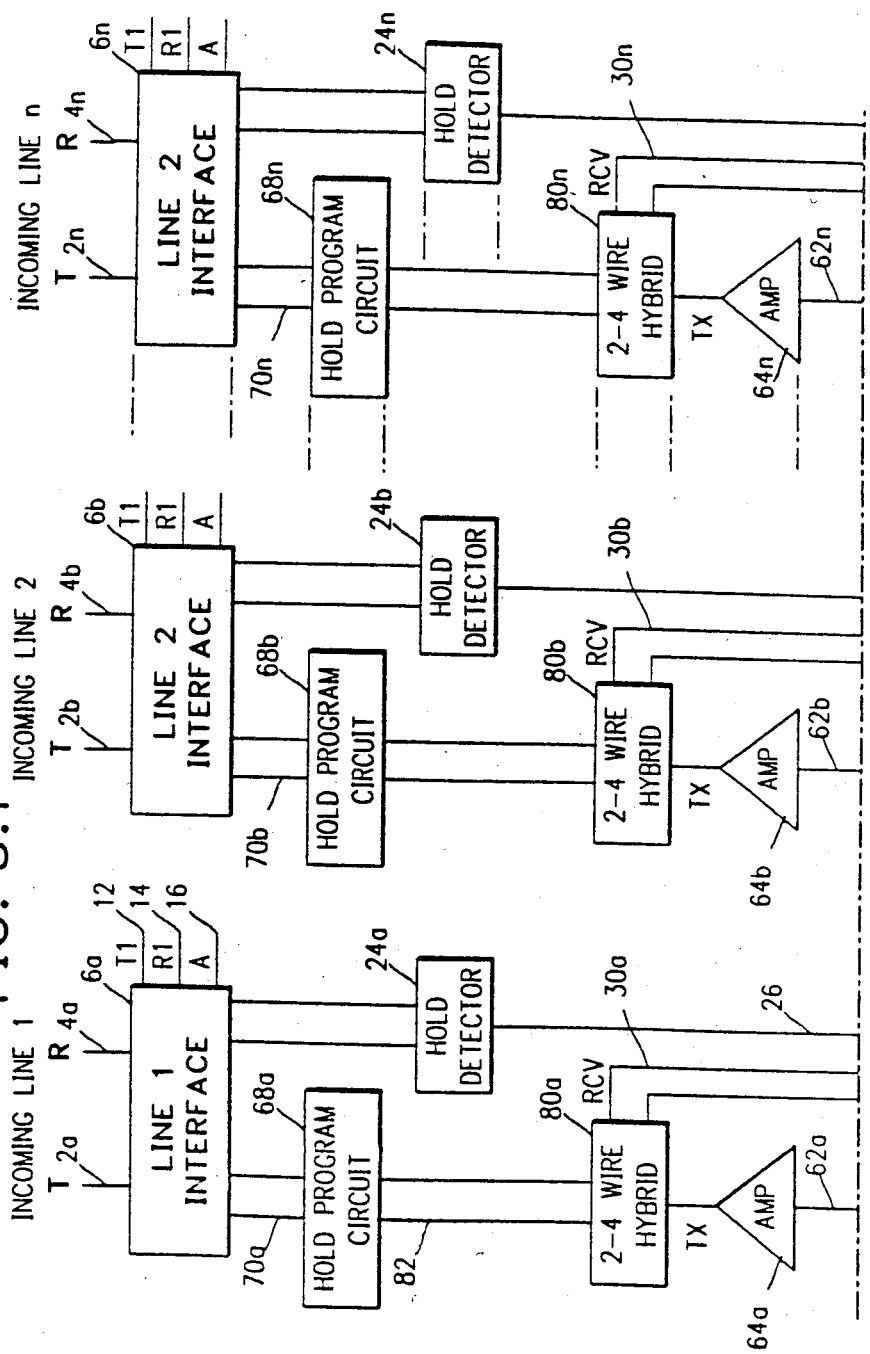

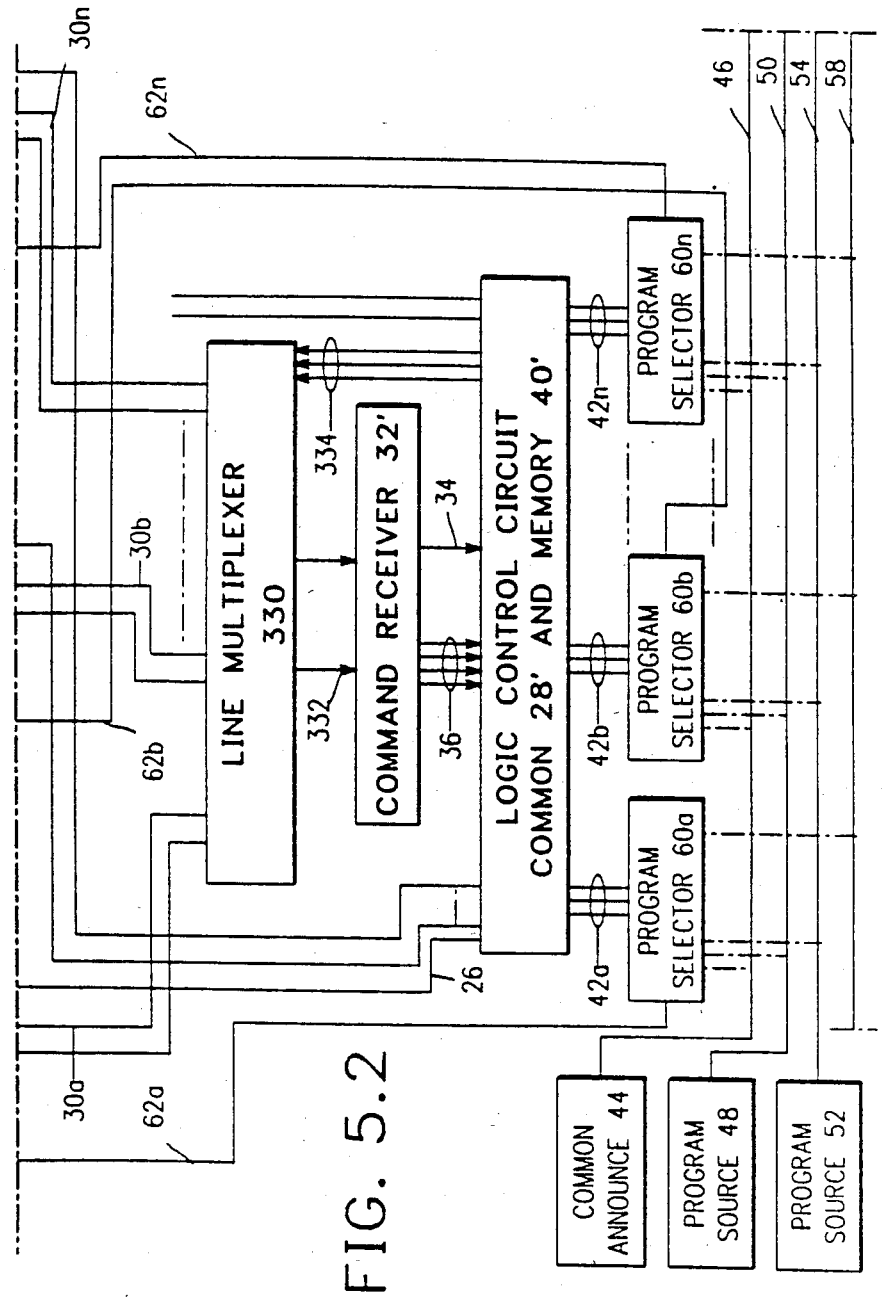
FIG. 5.2

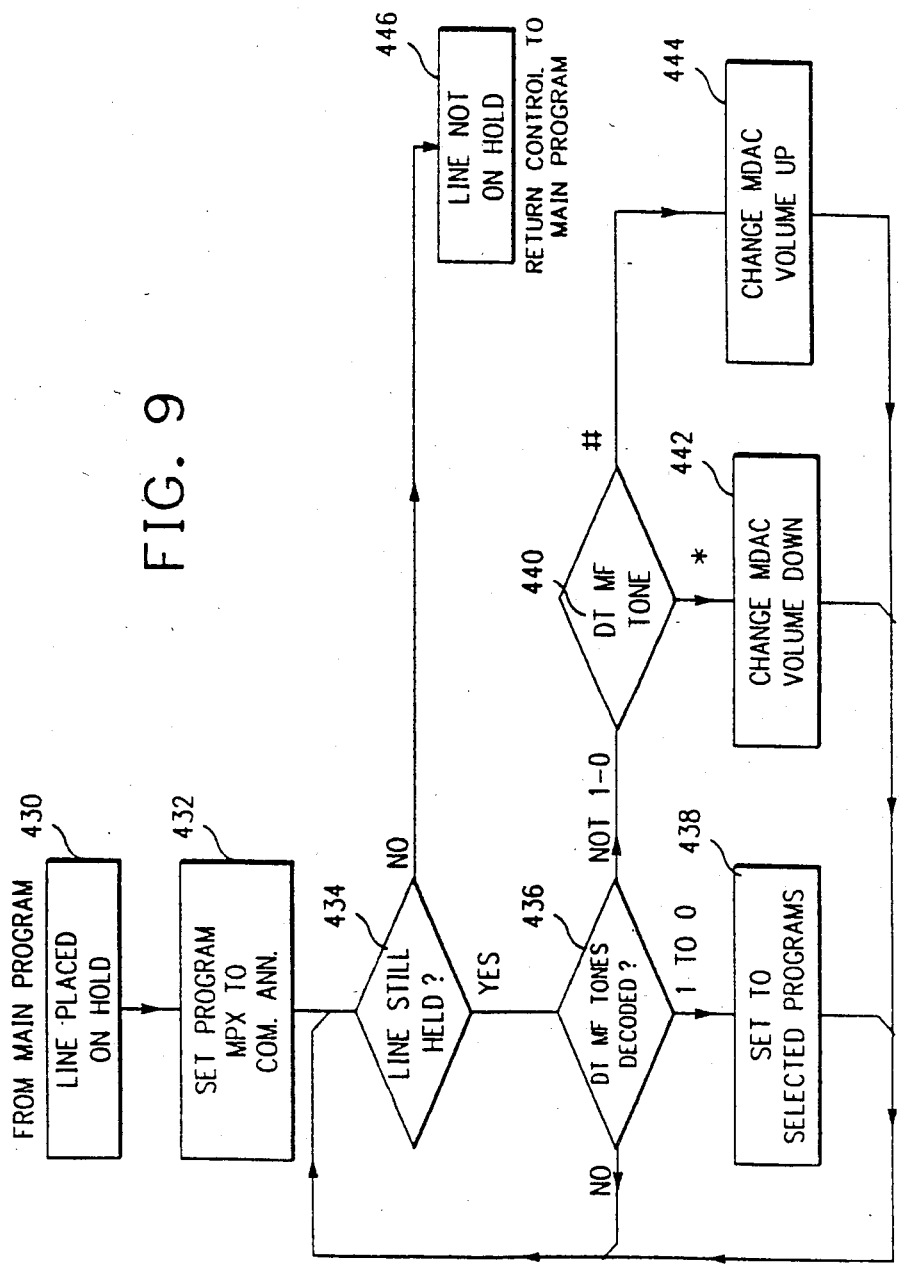

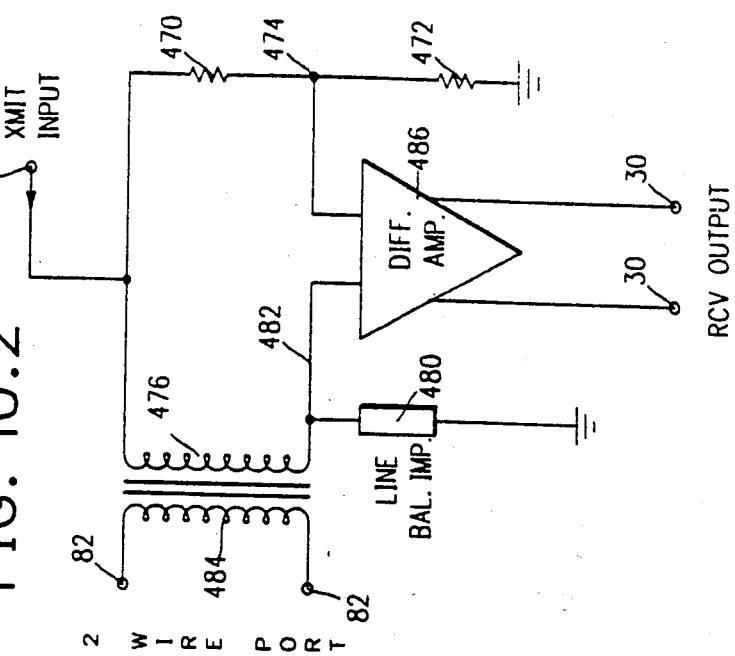
FIG. 10.2
ELECTRONIC IMPLEMENTATION
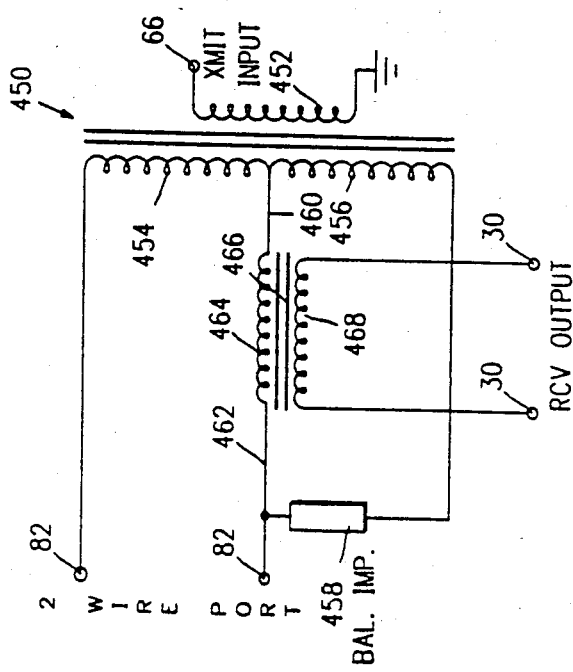
FIG. 10.1
TRANSFORMER IMPLEMENTATION

REMOTELY CONTROLLED TELEPHONE HOLD PROGRAM SYSTEM

FIELD OF THE INVENTION

This invention relates to telephone hold program systems and more particularly to a system for remotely controlling the programs provided in such hold program systems.

DESCRIPTION OF THE PRIOR ART

Business telephone systems having a plurality of incoming lines, and/or local telephone sets, are commonly known as "key telephone" or "Private Branch Exchange (PBX)" systems. Such systems incorporate a "hold" function which allows an incoming line to be transferred from a telephone set to a passive shunting bridge, while the subscriber's telephone is disconnected from the line. This bridge prevents disconnection of the incoming call during the hold interval. During the holding period, the held party hears no sound. He may grow bored or think he has been disconnected, and may hang up. Prior art systems are known which are directed to solving this problem by providing the held party with music or other form of program to occupy his time until the subscriber's call is again connected to a telephone. Such prior art systems are commercially known as "Music on Hold" or as "telephone hold program systems". One example of such telephone hold program systems is described in U.S. Pat. No. 3,246,082, issued to Alfred Levy, a co-inventor herein, for "Telephone Hold Program System". Other examples of telephone hold program systems are described in subsequently issued U.S. Pat. No. 3,794,774 to Kemmerly et al, for "Telephone Audio Program System"; U.S. Pat. No. 3,909,553 to Marshall, for "Line Card for Key Telephone Systems Adapted to Provide Music During Hold Condition"; U.S. Pat. No. 3,965,308 to Jones et al, for "Line Card Circuit"; U.S. Pat. No. 4,011,413 to Phillips, for "Hold Circuit for Telephone"; U.S. Pat. No. 4,056,695 to Angner et al, for "Key Telephone Line Circuit Tone-on-Hold Arrangement"; U.S. Pat. No. 4,090,038 to Biggs, for "Audio Signal on Hold Circuit"; U.S. Pat. No. 4,149,082 to Balter et al, for "Modulated RF Carrier Distributing Arrangement for Key Telephone Line Circuits"; and U.S. Pat. No. 4,219,701 to Feiner, for "Tone Generating Hold Impedance Circuit for Key Telephone Line Circuits". These patents disclose various techniques for generating and coupling program material, such as music or tones, into a held telephone line. The patents listed above as references 2-9 are all variations on the basic telephone hold program system technique taught by Levy in U.S. Pat. No. 3,246,082.

The program which these systems transmit is fixed and is chosen by the owner of the system or the subscriber. Usually, a background music type of program is chosen, such as an endless tape or a suitable radio station. One disadvantage of this type of system is that the held caller may not like the particular program chosen by the subscriber. Although the caller may listen for a brief interval regardless of the selection, if the holding interval is prolonged for some time, as is often the case, the caller may hang up, because he grows bored or because he dislikes the program being played. The caller may not call back, possibly resulting in the loss of good will and business for the subscriber.

Another problem with the current state of the art "Program on Hold" systems concerns the transmitted volume of the program. The output level is adjusted by the subscriber to an average value when the system is installed, or when the program is changed. The held caller will often be dissatisfied with the resulting program volume. If he is calling long distance, added losses or noise may make the program inaudible. A caller near the called party may get a short connection with low losses, causing too high volume. Additionally, some callers may want only a faint background music so they can concentrate on other tasks while being held, while others may find the program sufficiently interesting to want to listen intently, and thus they will desire a louder volume. A single transmitted signal level will be ideal to only a small minority of held callers.

It is an object of the present invention to enable a held caller to remotely select one of the several program sources to be applied to the held line. It is another object to provide a telephone hold program system which enables a held caller to remotely select the volume level of the transmitted program material applied to the held line. It is another object to provide a telephone hold program system which enables dual tone multifrequency push button dialing by the held caller to control the selection and/or volume of the program applied to the held line by the subscriber's system. It is another object to provide a telephone hold program system wherein the held caller's voice will control the selection and/or volume of the program applied to the held line.

SUMMARY OF THE INVENTION

The present invention solves these problems by allowing the held caller to exercise control over the program material selection and its volume. When he is put on hold, the caller first hears a "common announcement" which briefly explains the operation of the system, and the program choices available. The announcement is coupled into the held line applied to a held line. Then, the caller dials or speaks the number corresponding to the selection he chooses. This choice is transmitted over the telephone connection to the subscriber's equipment.

The system includes a command receiver and program selector which are adapted to receive the remote tone signal, voice, or other signal from the held line, decode or recognize it, and select the desired program source from a plurality of program sources, according to the choice number. Such a multiple program source could be a multitrack tape player, a plurality of radio receivers, a plurality of music or voice synthesizers, or a plurality of demultiplexers supplied by a multiplexed program source. The selected program is now applied to the held caller's line. In a multiline system, each held line may select any of the available programs. The program sources are common to all lines in the system. After selection, if the held party desires to change to another program, he may do so by sending another coded signal.

The transmitted program volume level may also be under electronic control. A distinctive signal sent by the held party can thus raise or lower the volume via a digitally controlled electronic level control, such as a multiplying digital to analog converter.

There are many advantages which result from the use of such a system. The held party may choose among many programs, one or more of which will presumably be of interest to him. A typical program "menu" might be:

Channel 1: "Easy Listening"
Channel 2: Jazz
Channel 3: Classical Symphony
Channel 4: Popular Music
Channel 5: Rock
Channel 6: Folk Music
Channel 7: Joke Track
Channel 8: Advertisements
Channel 9: Stock Market Reports The held party may also be induced to stay on the line longer by the novel interactive nature of the system. The system will respond to his command and allow him to try each one of the selections, or to change from one to another should he grow tired of any one program. Instead of idle listening to a single, possibly undesirable program, he now has a choice and something to do as well, while he waits. Thus, the held party is likely to remain on hold for even a lengthy interval, without being bored, and know he is still connected.

The business employing the system will experience fewer hangups on hold, and will derive improved communications and better business relationships as a result.

The user can now also adjust the volume of the program to suit his needs. He could make it so low as to be inaudible, if he prefers silence to any of the programs offered, or he can raise the volume if a selected program is of special interest. He can also adjust the volume to suit varying transmission path losses.

BRIEF DESCRIPTION OF THE DRAWINGS

FIG. 3 is a circuit diagram of the control circuit of the system;

FIGS. 4.1 and 4.2 are, respectively, circuit diagrams of two embodiments of hold detector circuits;

FIGS. 5.1 and 5.2 show a multiline system with multiplexer circuits and common circuitry for serving a plurality of incoming lines;

FIG. 9 is a flow diagram of the operation of the system of the present invention; and FIGS. 10.1 and 10.2 show, respectively, the transformer hybrid circuit and the electronic hybrid circuit.

DESCRIPTION OF THE PREFERRED EMBODIMENTS

Figure 1:
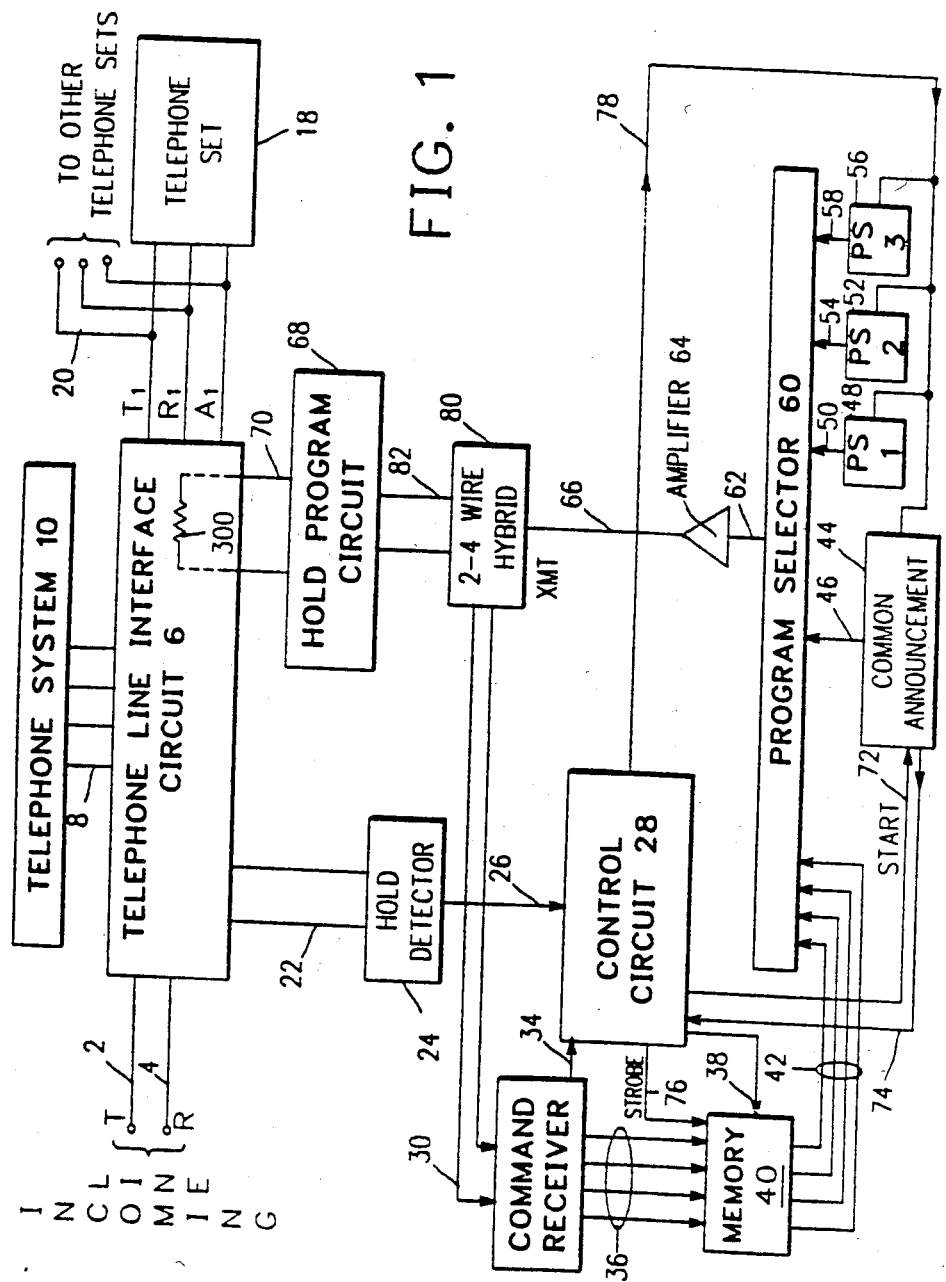
FIG. 1 is a general block diagram of the remotely controlled telephone hold program system in accordance with the present invention.

Referring to FIG. 1, there is shown the circuitry required to implement the system for one incoming telephone line. It is to be understood that the key and PBX telephone systems to which this invention applies generally include a plurality of such incoming lines, and thus in practice, the circuitry of the FIG. 1 schematic would be repated for each such line.

The conductors of the incoming line, commonly called "tip" and "ring", and here designated T and R respectively, are connected by lines 2 and 4 to a telephone line interface circuit 6. Circuit 6 is a conventional interface circuit, such as a type 400 line card manufactured by Western Electric Company, which provides control functions including sensing of the state of the line, holding, lamp control, etc. Such interface circuits are well known in the telephone art, and one such circuit is described in detail by co-inventor Alfred Levy in U.S. Pat. No. 3,246,082. Line interface circuit 6 connects to the local telephone set 18, via lines 12, 14, and 16 which are respectively the incoming tip T1 after passing through the interface; the incoming ring conductor R1 after passing through the interface; and a control lead A1 connecting the telephone's switch means with the interface circuit 6.

As mentioned above, the key and PBX systems include a plurality of local telephone sets, not shown, which are connected to line interface circuit 6 via conductors 20.

Line interface circuit 6 is interconnected to the remainder of the standard telephone system, 10, via conductors 8. This provides various power sources, timing signals and other equipment as needed for proper operation of the line interface. All items so far described are well known to the art and have been described in prior art patents, such as for example, the U.S. Pat. No. 2,810,016 to Knittle. During the time when the incoming line is idle, ringing or in use for conversation, the line interface circuit 6 is operated in the conventional manner.

When the user of the telephone set 18 puts the incoming line 2, 4, on hold via hold circuitry in line interface circuit 6, the following actions occur. The line interface circuit 6 is connected via lines 22 to a hold detector 24. Many techniques exist for implementing the hold detector function. Generally, the choice depends upon the type of telephone system and line interface circuitry employed. Hold detectors shown in FIGS. 4.1 and 4.2 are described below and provide an output on line 26 only when the line interface circuit 6 maintains the incoming line 2, 4 in a held condition. Upon receipt of this signal on line 26, a control circuit 28 is activated. As shown in FIG. 1, control circuit 28 is connected via line 34 to a command receiver 32 and via lines 38 and 76 to a memory 40 which in turn is connected to a program selector 60 via lines 42.

Control circuit 28 comprises a digital logic block, which controls the sequence of operations of the other components of the system. Control circuit 28 is shown in detail in FIG. 3. When control circuit 28 receives the output signal on line 26 from hold detector 24, it sends a code to the memory 40 via line 38 which causes its memory output lines 42 to be set to a particular digital number, for example, the binary code 0001. This digital code is applied to program selector 60 via lines 42.

A plurality of program sources, 44, 48, 52, and 56, are also connected to program selector 60 via lines 46, 50, 54, and 58 respectively. Such program sources can be any source of audio, digital or analog, such as tape players, radio tuners, commercial program lines, voice synthesizers, or music synthesizers. They may also be multiple outputs of a single device, for example, the output of different heads on a multitrack tape player. Source 44 is labeled as a common announcement and differs from the other sources in that it is a brief voice message, generally 10-40 seconds long, explaining the operation of the system. In response to the hold detector signal on line 26, control circuit 28 sends a signal via line 72 to common announcement 44 to start the message playing. One possible text for such message is, "Please hold for a moment. You can use your tone dial to select the music you hear while holding. Dial one for popular music, two for classical, three for jazz, and four for country western".

The digital code 0001 on lines 42 enters the program selector 60 and it thereby connects the common announcement source 44 to program selector output line 62. The program selector is in effect a digitally controllable selector switching device. The particular digital code on lines 42 will operate to enable a predetermined, selected program source to connect to program selector output line 62 via gating circuitry in program selector 60.

The output of program selector 60 is provided via line 62 to amplifier 64 which boosts the signal level and provides a low impedance output on line 66. Line 66 enters the transmit port of a hybrid 80, such as one of the hybrids shown in FIG. 10 and described below. The hybrid transmits the program to its two wire port 82, while canceling any transmit signal at port 30, the receive port. The two wire port 82 enters a hold program circuit 68 which is interconnected via lines 70 into the line interface circuit 6.

Hold program circuit 68 typically contains an impedance matching and isolating transformer, and D.C. blocking capacitors. The output of hold program circuit 68 connects via lines 70 across the conventional hold resistor 300 in line interface circuit 6. Thus, the audio program originally selected by program selector 60 is impressed across the hold impedance 300 in line interface 6 such that the calling party hears the program during the hold interval. It should be noted, also in accordance with Levy's prior art teaching, that the user of local telephone set 18 is free to connect his telephone across other incoming or local lines via conventional switch means, not shown, contained in said telephone set. These switch means disconnect the telephone from the held line and allow it to be connected to other lines during the interval that the first line is held.

The calling party is now on hold, and hears the message on the common announcement 44. After a predetermined time interval, the common announcement ends and common announcement source 44 may have an "end of the message" output on line 74, which indicates to control circuit 28 that the message has ended. Upon receipt of this signal, the control circuit 28 is readied to control selection of the program desired by the caller, as will be detailed below. Alternatively, control circuit 28 may include a detector to accomplish this end of the message detecting function without requiring a signal from the program source, such as by the use of a known time interval.

The held caller now signals the system to indicate the hold program he desires to hear. Many possibilities exist to accomplish this. One way is to use the dual tone multifrequency dial now in common use. This code signaling technique is well known to those skilled in the art. This type of dial emits a two-tone coded signal indicating numbers 0-9 and other symbols. These tones may be sent during the hold interval and used to remotely control the program selection, via a suitable tone decoder. Details of the circuitry in accordance with the present invention for implementing the selection of a program by a held caller are provided below.

Other signaling means are the use of a rotary dial or use of the user's voice. The rotary dial interrupts the D.C. line current a number of times corresponding to the number dialed. These pulses may be recognized, picked up and decoded by well known art. The user's voice can be used directly to control the selection via use of a speech recognizer circuit. These devices analyze the speech signal and choose one of a number of most likely words which most closely matches the input speech. Speech recognition systems for accomplishing this function are commercially available.

Regardless of the type of program selection signals transmitted by the held party, they will now appear across the incoming line 2,4. The signals pass through the line interface circuit 6 and hold program circuit 68 and appear at the two wire port 82 of hybrid 80. The hybrid passes these signals to its receive port 30 and thence to command receiver 32 which is essentially a decoding circuit. Upon receiving a valid signal, the command receiver 32 sends a "Data Valid" signal via line 34 to control circuit 28. This indicates that the signal has been successfully decoded, and that the digital number corresponding to the decoded signal is present on lines 36. Control circuit 28 now sends a "strobe" signal via line 76 which causes the memory 40 to receive and store the data on lines 36 and to output the stored data onto lines 42. The data on lines 42 enters the program selector 60 and connects the desired program sources 48, 52, or 56 to the transmitting circuitry via line 62. The program is played to the held party in the same manner as the common announcement was played, as described above. Should the held party wish to change his selection, the circuitry remains ready to receive any additional coded signals sent by the held party. He can try each program in turn and then decide which is most interesting to him. As long as the caller is held, he can hear the program and change it in the manner described above.

When the user of telephone set 18, or another telephone connected to the line interface circuit 6, again picks up the line and connects to it, the interface circuit 6 recognizes this and removes the holding bridge 300 by opening the contact 302. The audio program on lines 70 is now disconnected from the incoming line 2, 4 by contacts or switch means 302 in the line interface 6. The hold detector 24 indicates the end of the holding interval to control circuit 28. This resets the control circuit 28 which in turn resets the memory 40 in readiness for the next held call.

If tape sources are used for program sources, the tape motion may be started by the control circuit 28 when the hold interval begins, and stopped when it ends. This may be done via a control line designated 78, which may apply power to all program sources in common.

Figure 2:
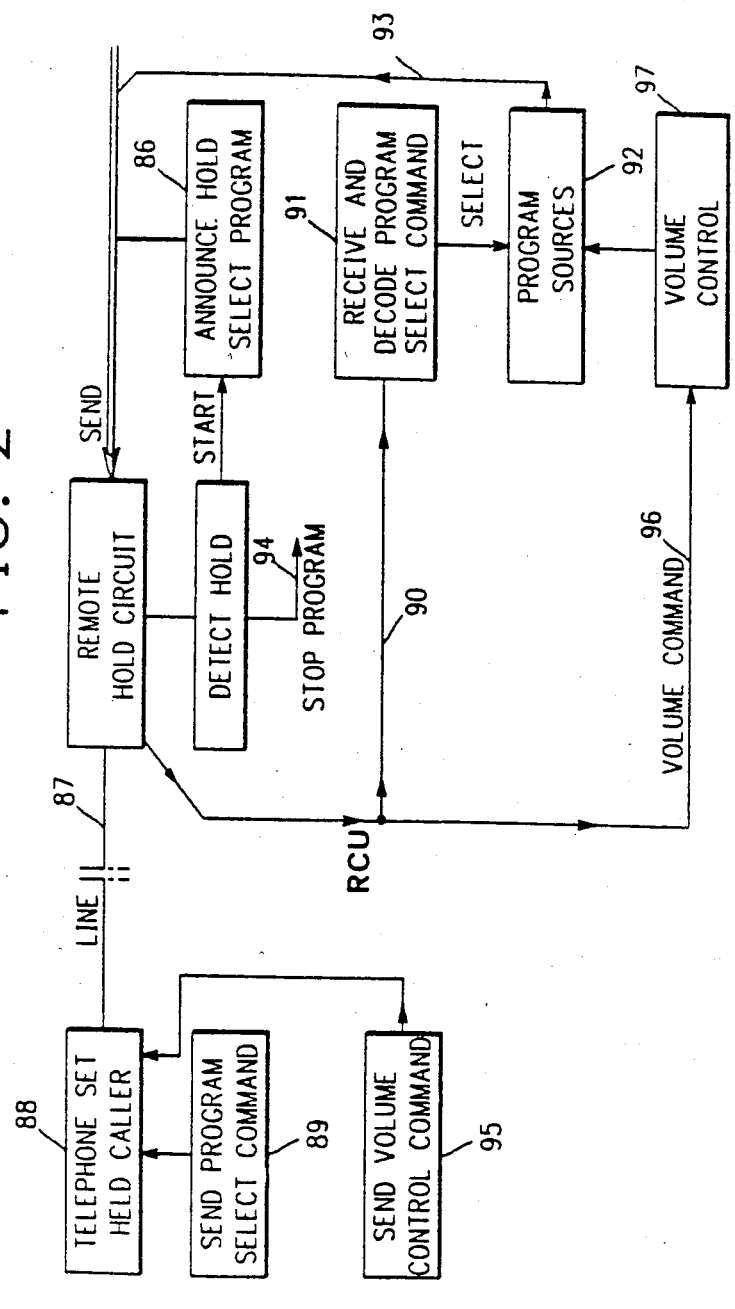
FIG. 2 is a functional circuit block diagram of the system of the present invention including the functional circuitry of both the caller on hold and the hold program select system.

Referring to FIG. 2, there is shown a functional circuit block diagram of the remote program control system in accordance with the present invention. The equipment of the caller on hold is shown on the left side of FIG. 2 while the telephone system at the other end of the line is shown on the right side of FIG. 2. When a caller is put on hold by a hold circuit 84, a hold detector 85 provides a detect signal to start the common announcement to announce the hold select program at 86. This announcement is sent via a program selector 93, a volume control 97, hold circuit 84 and the communications line 87 to the held caller's telephone set 88 where the caller first hears the announcement which briefly explains the operation of the system, and the program choices available. Then, the caller dials or speaks a command at 89 on his command generator 83 the number, tone, signal or sound corresponding to his program selection. Command generator 83 is a tone generator from the telephone set or acoustic coupling means or other suitable signal generating means. This choice is transmitted over the telephone line 87 to the telephone system where it is received on line 90 as a remote tone signal or voice command from the held line. The select command is decoded at 91 and applied to selector 93 which selects the desired program source from a plurality of program sources 92. The selected program is transmitted via volume control 97 and hold circuit 84 for application over line 87 to the held caller's line 89. When the incoming line 87 is disconnected from the hold circuit 84, this is detected at 85 by a system reset signal on line 94.

The held caller can also control the volume of the program by a command 95 via command generator 83 providing a volume control command signal which is received on line 90 and decoded at 91 to a signal 96 to effect volume control 97 of the program sources 92.

Referring to FIG. 3, there is shown a circuit diagram of control circuit 28 which receives the hold detector output on line 26, the common announcement end signal on line 74, the command data valid signal on 34, and a source of D.C. power on line 98. Gating logic circuitry produces a memory reset to common announcement on line 38, a start common announcement on line 72, a memory strobe on line 76, and switched power to program sources on line 78.

When power is applied to the system, and to control circuit 28 via line 98, an RC network composed of resistor 120 and capacitor 118 differentiates the rising edge of the power voltage, and provides a pulse upon turn-on to an input of OR gate 122. The output of gate 122 resets flip-flop 110 via its reset input, RE. This action puts flip-flop 110 in the correct state upon power-up with output Q low and output $\overline{Q}$ high.

When the incoming line 2, 4 is put on hold, the hold detector 24 provides an output on line 26 which stays high for the duration of the hold interval. The program sources, including the common announcement, 44, 48, 52, 56 are normally turned off. When the line is held, these sources are provided with switched power via line 78. The hold detector signal on line 26 saturates NPN transistor 102 with resistor 100 serving to limit current. This in turn saturates PNP power transistor 106 with resistor 104 limiting the base current. Transistor 106 is in series with the D.C. power source 98 and the power output to the program sources 78. Thus, the program sources are provided with power only when the line is on hold.

When the hold detector output 26 goes high, it operates positive edge monostable multivibrator 108 (MMV) which produces a relatively brief output pulse when the input signal goes from low to high. This pulse is applied to flip-flop 110, causing its outputs to toggle. The Q output goes high on memory reset line 38 to cause the memory 40 output to provide a digital number corresponding to the common announcement selection. MMV 124 receives the same flip-flop output on line 38 and provides a brief pulse on line 72 to start the common announcement 44.

When the common announcement 44 has played out its message once, it provides an output on line 74 indicating the end thereof. This enters MMV 112 which provides a pulse to OR gate 122 to reset the flip-flop 110. Flip-flop 110 toggles again with Q going low to release the memory reset to common announcement via line 38.

When the held party has heard the common announcement, he can then make his program selection via signals such as a dial tone or by voice. The signals enter command receiver 32 shown in FIG. 1 to provide decoded data on lines 36. This data may not always be valid, and, therefore a "data valid" signal on line 34 is high only when properly recognized and decoded data has been received. The data on line 36 must be strobed into the memory 40 only when the command data is valid, the line is on hold, and the common announcement is not running. This logic is implemented by three input AND gate 126 which receives a command data valid signal on line 34, a hold detector signal on line 26, and the $\overline{Q}$ output of flip-flop 110 on line 127. These three signals must all simultaneously be high to cause AND gate 126 output to go high. Thus, the logical condition outlined above for the presence of a memory strobe is satisfied by gate 126. The gate output is shaped into a brief pulse by MMV 128, which provides the memory strobe signal on line 76. This action repeats each time the held party sends a new command. Thus, the command receiver data 36 is strobed via line 76 into memory 40.

When the incoming line goes off hold, the hold detector signal on line 26 goes low to switch off power on line 78 to program sources by turning off transistors 102 and 106. If the hold condition ends before the common annoucement is ended, provision is made to reset the flip-flop 110 so as to return the system to an idle state. This is done by inverting the hold detect signal on line 26 in inverter 114, and applying the inverted signal to MMV 116 which provides a pulse upon the rising edge of the inverter output or the falling edge of the hold detector signal 26. The pulse is applied through OR gate 122 and resets flip-flop 110 via its reset terminal RE.

Referring to FIG. 4.1, there is shown details of the hold detector circuit block 24. The hold detector circuit 24 operates with any telephone system employing a separate path for line current during the hold interval from that used when the line is in use for conversation. Generally, hold detector 24 senses the appearance of D.C. line voltage across the hold impedance 300. In FIG. 4.1, the incoming line 2, 4, enters the line interface circuit 6, a portion of which is shown in detail. When the line 2, 4, is to be held, a switch means 302 such as a conventional hold key, hold button or switch closes so that a hold impedance, such as resistor 300, is shunted across the incoming line. Lines 22 are connected across resistor 300 and connect it to the hold detector circuitry which senses the voltage appearing across hold resistor 300 when the line is on hold, depending on the loop resistance and the hold resistor. When the line is not held, this voltage is at zero. The detector should provide a logic type output, referred to system ground, and isolated from the incoming line. The voltage on conductors 22 is first applied to bridge rectifier diodes 304 which act as a polarity guard and ensure that current flow is of the correct polarity in the succeeding circuitry. Component 306 is a current limiting diode, although a thermistor or resistor or other device could be used as well. This thermistor acts as a short circuit until a particular current flow is reached. Further attempts to increase current above the limit result in increasing voltage drop across the current limiter. The current flows through light emitting diode (LED) 308. The current limiter 306 serves to protect the LED from excess current. The LED is optically coupled to photodiode 310. It should be understood that this device could be a phototransistor, photocell or other photosensitive device as well. A source of local D.C. power is applied to the conductor 314. The LED 308 light shines on photodiode 310 and causes it to conduct. Current then flows from D.C. source 314 into the input terminal 316 of current amplifier 312. This amplifier is designed so that for currents above a lower limit, it provides a standard logic signal on its output line 26. This is the output of the hold detector circuit. It is to be understood that LED 308 and photodiode 310 may be integrated in one package such as an integrated circuit, and that other components shown, such as rectifier 304, current limiter 306, and/or amplifier 312 could be included therein as well.

FIG. 4.2 shows another embodiment of the hold detector circuit wherein the hold detector is inserted in series with the hold impedance and the current flow through it is sensed, rather than sensing the voltage across the hold resistor 300. Where the circuit elements in FIG. 4.2 are identical to those in FIG. 4.1, the same numerals are indicated. Lines 22 are in series with hold resistor 300. Diodes 304 serve a similar function to that indicated in the FIG. 4.1 description. The hold current flows through zener diode 318 and generates a constant voltage, such as about 2.4 volts. Resistor 320 limits current flow through LED 308. The remainder of the circuit operates in identical fashion to same elements shown in FIG. 4.1.

Referring to FIGS. 5.1 and 5.2, there is shown the multiline system arrangement of the present invention with multiplexer circuits for serving several incoming lines 2a, 4a, 2b, 4b through 2n, 4n. Program sources 44, 48, 52 control circuit 28', command receiver 32' and memory 40' simultaneously serve all lines in the system in common. Each line is served by individual circuitry, respectively, line interfaces 6a-6n, hold detectors 24a-24n, amplifiers 64a-64n, program selectors 60a-60n, hold program circuits 68a-68n and hybrids 80a-80n. Program sources 44, 48, 52 are fed to all program selector inputs in parallel so that all incoming held lines have access to all program sources. Command receiver 32', control circuit 28' and memory 40' are essentially the same as shown and described in FIGS. 1 and 2, except that such circuit elements are sequentially switched among the several inputs and outputs by a line multiplexer 330 using conventional multiplexing techniques. The hybrid receive outputs 30a, 30b, 30n are connected to line multiplexer 330 which is a digitally controlled selector similar to program selector 60. Control circuit 28' provides a continuously changing address to the multiplexer 330 via lines 334. This causes each incoming line 2a-2n, 4a-4n to be connected via line interfaces 6a-6n to hold program circuits 68a-68n and hybrids 80a-80n, to the command receiver 32' via lines 30a-30n through the multiplexer 330 and multiplexer output lines 332. The switching action serves each line by the single common command receiver 32' which is similar to receiver 32 shown in FIG. 1, but is adapted for receiving the multiplexed inputs. The receiver output consists not only of data and a data valid signal on line 34, but also of lines 336 which provide decoded program numbers for each incoming line to control the appropate program selectors 60a-60n via data lines 42a-42n.

Figure 6:
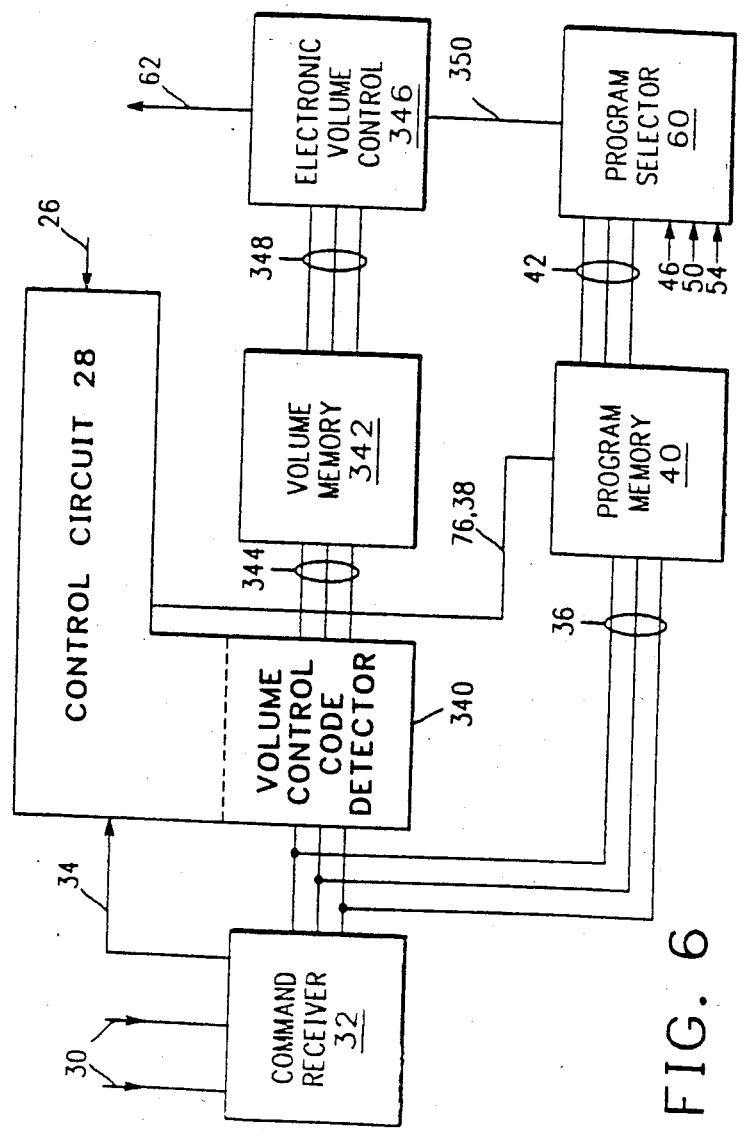
FIG. 6 is a circuit block diagram of the remote volume adjustment circuitry.

FIG. 6 shows the remote volume adjustment circuitry which allow the held party to use remote signaling techniques to change the volume of the program heard. The basic system of FIG. 1 is employed as shown, but additional codes are used to indicate volume changes. These special codes appear at the output lines 36 of command receiver 32 which also connect to a volume control code detector 340. When a distinctive volume control code is received and detected by volume control code detector, the prior program selection is maintained in program memory 40, but the volume change information is sent from detector 340 to a volume memory 342 via conductors 344. Volume memory 342 maintains this data until a further volume change is desired by the held party. The volume data enters an electronic volume control 346 via lines 348.

The electronic volume control 346 is a 2 input device. An audio signal from program selector 60 enters via line 350. The stored volume control data on lines 348 determines the gain of volume control 346. Well known techniques exist to implement the volume control, such as a multiplying digital to analog converter. Commercially available integrated circuits may be used to implement this function, such as the Analog Devices, Inc., Part No. AD7524. The output signal on line 62 has an amplitude which is proportional to the digital number on lines 348 multiplied by the input analog signal on line 350. Thus, the data on lines 348 controls the volume of the signal on line 62. The output on 62 is amplified at 64 shown in FIG. 1, and enters the line interface circuit 6 via the hybrid 80 and the hold program circuit 68 as in FIG. 1. In this fashion, the special codes sent by the held party are recognized and used to control the volume of the program he hears.

One way to provide special volume control codes is to use the 11th and 12th symbols on a dual tone multifrequency dial, # and *. The numerals 0 to 9 could designate program selections while # could indicate louder, and * when softer volume is desired. Each operation of these buttons could increase or decrease the volume in steps of, for example, 2 db. Alternatively, a two symbol system could be done with # and then a number following it to designate the volume level desired: #9 giving the loudest and #0 giving the minimum.

Figure 7:
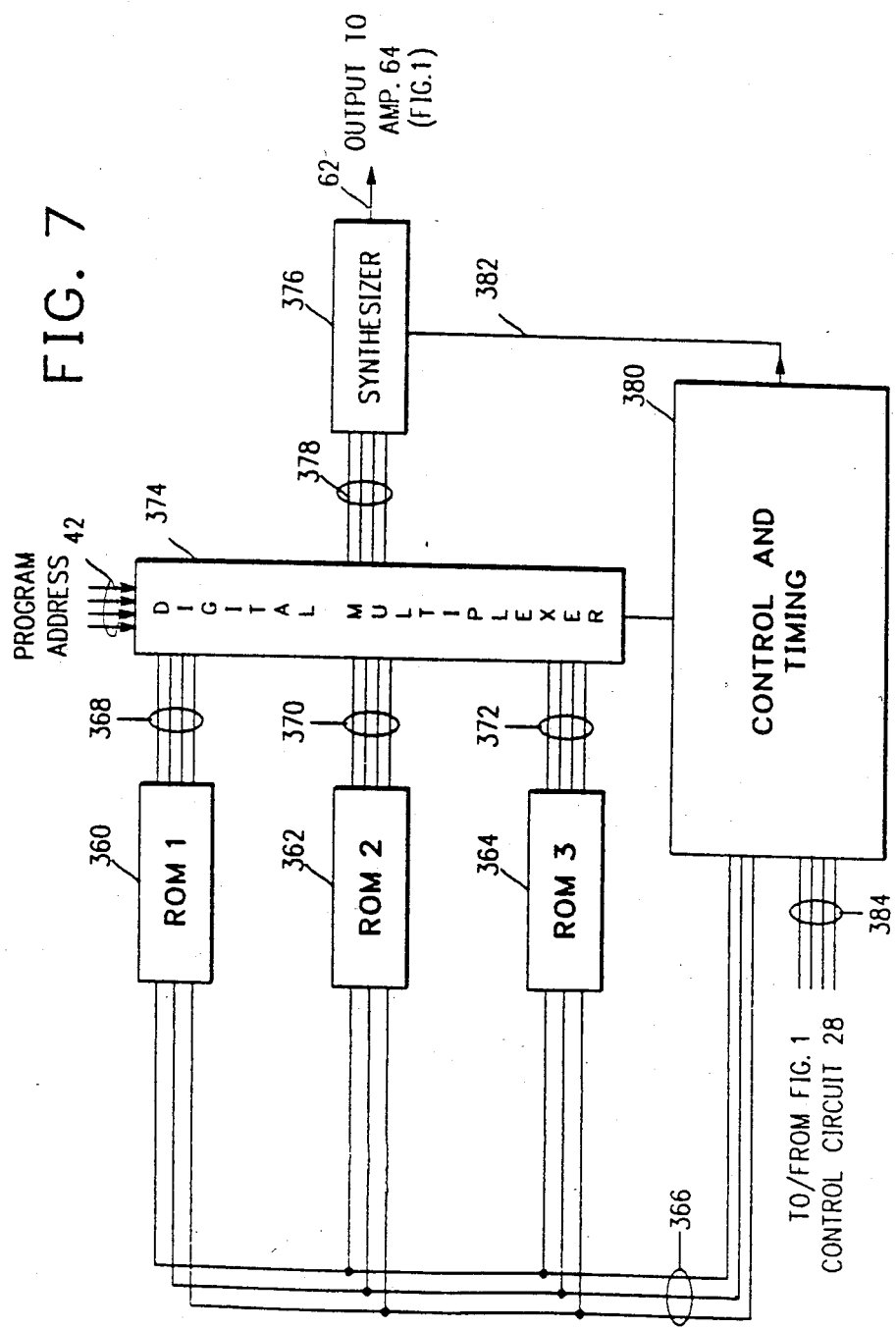
FIG. 7 shows the system adapted for use with a digital program storage and synthesizer.

The program source in FIG. 1 may be either digital or analog in nature. If a read only memory, (ROM), or other digital storage technique is used, then the program selector 60 of FIG. 1 switches the digital data directly, prior to its conversion to analog form. FIG. 7 shows such system wherein program sources 44, 48, 52 of FIG. 1 have been replaced by three ROMS 360, 362 and 364. These ROMS store a complete program, and share common address, timing and control signals represented by lines 366 from control and timing block 380. The output of the ROMS on data busses 368, 370, 372 enters a program selector 374, which is a digital multiplexer which serves the same function as program selector 60 in FIG. 1. The program memory 40 of FIG. 1 supplies the digital program address corresponding to the program selection desired, to the multiplexer 374 via lines 42. Multiplexer 374 selects the appropriate ROM data bus under control of the control and timing block, 380, via line 386. The output goes to an audio/speech synthesizer 376 via lines 378. Synthesizer 376 takes the digital data and generates a corresponding analog speech and/or music output on line 62, which then enters the amplifier 64 of FIG. 1. Synthesizer 376 receives control and timing signals via lines 382 from a control and timing block 380 which is in turn controlled from the FIG. 1 control circuit 28 via lines 384.

It is to be understood that multiplexer 374 can be replaced by a direct connection of all like weighted data lines of all ROMS if "tristate" logic is used in the ROMS to shut off the de-selected ROMS. The program address lines 42 would then go to ROM enable lines via an appropriate decoder. This is a technique well known to those skilled in the digital memory art. Another possible modification of FIG. 7 employs a matrix or crossbar type switch for multiplexor 374 to direct the ROM outputs to many synthesizers, one per held line or line interface. Here, only one ROM per program is required, regardless of the number of held lines in the system.

Figure 8:
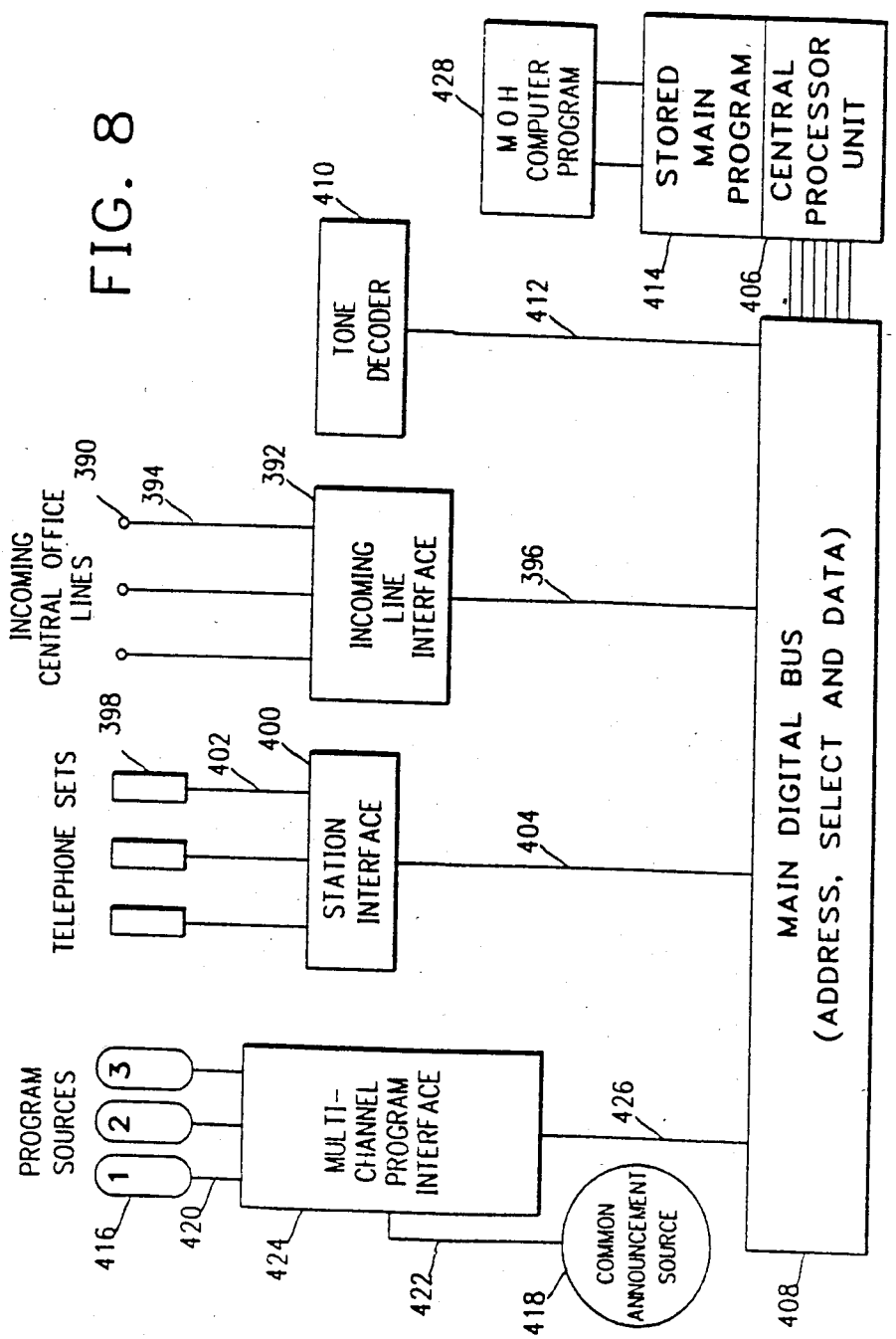
FIG. 8 is a general block diagram illustrating the implementation of the system of the present invention in a digital computer controlled telephone system.

In telephone systems which use digital computer control, the preferred circuit embodiments will differ significantly from those described above, although the basic concepts remain unchanged. FIG. 8 shows a generalized block diagram of a typical digital telephone system. Incoming lines 390 from the central office connect to a line interface 392 via line connections 394. The line interface 392 performs line state detection, signaling (D.C. hookswitch, ringing etc.), 2 to 4 wire conversion, analog to digital (receive side) and digital to analog (transmit side) conversion. The inputs and outputs to interface 392 occur via digital pathways 396 which attach the line interfaces to the computer.

The telephone sets 398 are interfaced in similar fashion by station interface 400 to the computer via connections 402 and line 404. The various parts of the system are linked to the main CPU control 406 via a digital bus 408. This is a bidirectional multiplexed pathway for data, addresses, control signals and select signals. The various devices are time multiplexed in sequence over bus 408. Generally, a tone decoder 410 is used to decode multifrequency control tones generated in the tone dials of the various stations. The decoded tone signals are linked to the bus 408 via line 412. Finally, a program 414 in the memory of CPU 406 controls the overall timing of the system. The preceeding describes a standard state of the art digital telephone system.

Implementation of the remote program control music on hold feature to such digital telephone system requires a plurality of analog or digital program sources, 416 and a common announcement source 418, similar to sources 44, 48, 52 and 56 shown in FIG. 1. These sources are linked via lines 420, 422 respectively, to a multichannel interface 424. In the case of an analog input, this includes one or more analog to digital converters and a multiplexer if only one analog to digital converter is used. For digital sources, it contains appropriate timing and synchronization so as to interface the various sources onto the bus. The interface 424 links to digital bus 408 via line 426. Main computer program 414 is modified by the addition of a special music-on-hold remote control program 428 which may be a subroutine of the main program or may run in parallel with it.

FIG. 9 is a flow diagram of the operation of the overall system. Referring to both FIG. 9 and FIG. 8, when the telephone system places a line on hold, control of that line passes from the main program 414 to the remote program control subroutine 428. The program is entered at 430 and the first step, 432, comprises the program instructing the central office line interface 392 to place the common announcement source 418 onto line 390 via the various interfaces, bus 408, and CPU 406. The held caller hears the common announcement and is told of the system's operation and the menu of programs. The caller then dials the desired program number via his tone dial. Incoming line 390 carries these tones into the system where they are converted to digital by line interface 392, and then multiplexed onto the bus 408. Tone decoder 410 decodes these tones into digital form for processing in CPU 406. MOH program 428 checks if the line is still held at step 434 and if it is, whether valid tones were received at step 436. If a tone 1 to 0 was received, step 438 instructs the computer 406 to select the indicated program source 416 and direct its data to the interface 392 for the held line 390 via bus 408.

If the star (*) of pound (#) symbol is dialed, the program moves to step 440 where the decoded symbols determine whether the volume decrease command at 442, or volume increase command at 444 will be used. These commands instruct the CPU 406 to control the volume of the program sent out on line 390 by digitally multiplying the data for that line by a coefficient. A multiplying digital to analog converter, not shown, may also be used in the line interface 392. After each operation 438, 442 or 444, the program returns to step 434, where the line is checked as to whether it is still on hold. If the line is no longer being held, control returns to the main program via step 446. If no tones are sent, the program circulates in steps 436 and 434 until valid tones are received, or until the line is no longer on hold.

The program steps in the digital system of FIGS. 7 and 8 are the same as those in the non-digital implementation described above. The collar is put on hold. He hears a short common announcement describing the system's operation. Next, he dials the desired program number. The system selects this program from among the several available, and places this selected program onto the held line. The caller hears the desired program, and can change it at any time. Additionally, the volume may be changed, or it may be shut off entirely. If the caller fails to send any tones, the program will default to a particular predetermined program source, and the held caller will hear that program in the absence of making a selection.

FIG. 10 shows two types of the two to four wire hybrid 80, shown in FIGS. 1, 5 and 6. The function of the hybrid is to separate the outgoing transmitted program material on line 82 from the received tones incoming from the same line. Since the command tones may be present during program transmission, the command receiver 32, bridged directly across incoming line 2, 4, will receive both the command tones and the outgoing program mixed together. This may make tone decoding unreliable, if not impossible. The hybrid has three ports or connections. Program material is applied to a transmit port 66. This signal appears at the two wire port 82 which ultimately connects to the telephone line 2, 4 via hold program circuit 68 and line interface circuit 6. The third port 30 will go to command receiver 32 or tone decoder. Hybrid 80 cancels or isolates the transmitted program, thus preventing it from appearing at the receive port and at the command receiver 32. The transmitted program at 66 appears at the two wire port 82, and received commands at the two wire port 82 appear at the receive port 30.

The circuit of a hybrid is basically that of a balanced bridge. In the transformer implementation shown in FIG. 10.1, the transmit signal is applied at point 66 to transformer 450 via winding 454. connected in series with balancing impedance 458. Two windings 454 and 456 are of equal turns such that the voltages induced by the transmit signal are equal in magnitude across such windings 454 and 456. Line balancing impedance 458 is designed to match the transformer reflected impedance of the 4 wire port as closely as possible. If the balance is perfect, then the two wire port 82 receives a voltage equal to that on winding 454. The voltage induced at the receive port 30, due to the transmitted signal at 66 is zero, canceled due to opposite polarity and equal magnitude of voltage across winding 454 and balancing impedance 458. Thus, no transmitted signal will appear at the receive port. Signals applied to the two wire port 82 will appear with 3 db attenuation at the receive port 30. This can be shown by superposition. We can use this known analysis principle by replacing the transmit source with its output impedance Rs (464). If the transformer 450 is of equal turns on all three of its windings, and Rs (464) equals Rl (466), then the transformer windings, 454, 456, provide equal outputs to both transmit port 66 and receive port 30. A simple resistive circuit results, with no voltage across balancing impedance 458. The hybrid passes the signal on the two wire port 82 to the receive port 30 with an attenuation of, for example, 3 db.

The same hybrid principle is implemented electronically in FIG. 10.2. The transmitted signal on point 66 is applied to two equal resistors 470 and 472 in series. One half the transmit voltage appears at the common point 474. The transmit signal also goes to the winding 476 of transformer 478 in series with line balancing impedance 480. The signal at point 482 will also be one half the transmitted signal if the line balancing impedance is equal to the line impedance at the two wire port 82. The two wire port is connected to winding 484 of transformer 478, which is assumed to be of the same number of turns as winding 476. The transmit input will be canceled if the differential voltage from point 482 to point 474 is used, since these two voltages are equal. Differential amplifier 486 performs this function of taking the difference between such two voltages. Its output is provided on points 30 and forms the receive port of the hybrid. Incoming signals on the two wire port 82 will appear in attenuated form at the receive port 30 in exactly analogous manner as that described above for the transformer hybrid.

Commercially available components can be employed in the above-described circuits. For example, the electronic hydrid can be implemented by a Texas Instrument type TCM 4204 integrated circuit. This provides for computer control of transmit and receive gain, and of line balancing impedance selection. Transformers designed for hybrid use are also available from many sources.

It should also be noted that the functions of impedance matching and isolation performed in the hold program circuit 68 of FIGS. 1 and 5 may be combined into the hybrid function, as these properties may be easily designed into the hybrid in a conventional manner.

It should be understood that the embodiment of the invention described herein is intended to be illustrative of the invention and that various changes can be made to such embodiment without departing from the spirit and scope of the invention.

What is claimed is:

1. A system for providing remote program selection by a held caller during the hold connection in a telephone hold program system wherein said held caller's line is connected to a holding circuit and a program is transmitted to the held caller, comprising:
    said holding circuit including hold impedance means which is shunted across said held caller's line when said held caller's line is placed on hold until said line is removed from hold and placed in use with a party available for communication with said held caller;
    hold detection means for detecting when a line is being held by said hold impedance means in said holding circuit;
    program select announcement means for transmitting instructions over said held line to said held caller for remotely selecting one of a plurality of programs;
    switching means, responsive to said hold detection means, for causing said program select announcement means to be played over said held line to said held caller;
    program select signalling means, at said held caller's location, for sending select signals over said caller's line, when said line is being held, for selecting one of a plurality of programs to be played to said held caller;
    select signal decoding means for receiving and decoding said select signals sent by said held caller to select the particular program signalled by said held caller;
    a plurality of program source means;
    program select means, responsive to said select signal decoding means, and connected to said plurality of program source means, for selecting one of said plurality of program sources, determined by the select signal decoding means; and
    hold program circuit means connected to said program select means, and responsive to said hold detection means, for coupling the selected program source to said held caller's line during the period that the held caller is on hold;
whereby the held caller will receive the program source material which said held caller has selected remotely from said plurality of program source means.

2. A system for providing remote program selection by a held caller in a telephone hold program system wherein a caller's line is connected to a holding circuit and a program is transmitted to the held caller, comprising:
    hold detection means for detecting when a line is being held by said holding circuit;
    program select announcement means, coupled to said held line, for transmitting instructions to said held caller for remotely selecting one of a plurality of programs;
    program select signalling means, at said held caller's location, for sending select signals over said caller's line, when said line is being held, for selecting one of a plurality of programs;
    select signal decoding means for receiving and decoding said select signals sent by said held caller to select the particular program signalled by said held caller;
    a plurality of program source means;
    program select means, responsive to said select signal decoding means, and connected to said plurality of program source means, for selecting one of said plurality of program sources, determined by the select signal decoding means;

hold program circuit means connected to said program select means, for coupling the selected program source to said held caller's line; and electronic remote volume control means connected between said program source means and said hold program circuit means, said volume control means being controlled by means for detecting a volume control command signal sent by said held caller, whereby said volume control command signal sent by said held caller will remotely control the volume level of the program supplied to said held caller;

whereby the held caller will receive the program source material which said held caller has selected remotely from said plurality of program source means.

3. A system for providing remote program selection by a held caller in a telephone hold program system wherein a caller's line is connected to a holding circuit and a program is transmitted to the held caller, comprising:

hold detection means for detecting when a line is being held by said holding circuit;

program select signalling means, at said held caller's location, for sending select signals over said caller's line, when said line is being held, for selecting one of a plurality of programs;

select signal decoding means for receiving and decoding said select signals sent by said held caller to select the particular program signalled by said held caller;

a plurality of program source means;

program select means, responsive to said select signal decoding means, and connected to said plurality of program source means, for selecting one of said plurality of program sources, determined by the select signal decoding means;

hold program circuit means connected to said program select means, for coupling the selected program source to said held caller's line; and electronic remote volume control means connected between said program source means and said hold program circuit means, said volume control means being controlled by means for detecting a volume control command signal sent by said held caller, whereby said volume control command signal sent by said held caller will remotely control the volume level of the program supplied to said held caller;

whereby the held caller will receive the program source material which said held caller has selected remotely from said plurality of program source means.

4. A system for providing remote program selection by a held caller during the hold connection in a telephone hold program system wherein said held caller's line is connected to a holding circuit and a program is transmitted to the held caller, comprising:

said holding circuit having means for placing said held caller's line on hold until said line is removed from hold and placed in use with a party available for communication with said held caller;

hold detection means for detecting when a line is being held by said holding circuit;

program select signalling means, at said held caller's location, for sending select signals over said caller's line, when said line is being held, for selecting one of a plurality of programs to be played to said held caller;

select signal decoding means, responsive to said hold detection means, for receiving and decoding said select signals sent by said held caller to select the particular program signalled by said held caller;

a plurality of program source means;

program select means, responsive to said select signal decoding means, and connected to said plurality of program source means, for selecting one of said plurality of program sources, determined by the select signal decoding means;

held program circuit means connected to said program select means, and responsive to said hold detection means, for coupling the selected program source to said held caller's line during the period that the held caller is on hold said hold program circuit means including control gating means connected to said hold detection means for terminating said transmission of a selected program when a line is disconnected from said holding circuit;

whereby the held caller will receive the program source material which said held caller has selected remotely from said plurality of program source means.

5. A system for providing remote program selection by a held caller during the hold connection in a telephone hold program system wherein said held caller's line is connected to a holding circuit and a program is transmitted to the held caller, comprising:

said holding circuit including hold impedance means which is shunted across said held caller's line when said held caller's line is placed on hold until said line is removed from hold and placed in use with a party available for communication with said held caller;

hold detection means for detecting when a line is being held by said hold impedance means in said holding circuit;

program select signalling means, at said held caller's location, for sending select signals over said caller's line, when said line is being held, for selecting one of a plurality of programs to be played to said held caller;

select signal decoding means, responsive to said hold detection means, for receiving and decoding said select signals sent by said held caller to select the particular program signalled by said held caller;

a plurality of program source means;

program select means, responsive to said select signal decoding means, and connected to said plurality of program source means, for selecting one of said plurality of program sources, determined by the select signal decoding means; and hold program circuit means connected to said program select means, and responsive to said hold detection means, for coupling the selected program source to said held caller's line during the period that the held caller is on hold;

whereby the held caller will receive the program source material which said held caller has selected remotely from said plurality of program source means.

6. A system as recited in claim 5, further comprising program select announcement means, coupled to said caller's line, for transmitting instructions to said held caller for remotely selecting, from said held caller's location, one of said program source means.

7. A system recited in claim 6, further comprising first control gating means connected to said hold detection means for initiating said program select announcement means after a line is being placed in the hold condition, and second control gating means for enabling said select signal decoding means after said program select announcement means has transmitted said instructions to said held caller, whereby the selected program will be communicated to said held caller.

8. A system as recited in claim 5 wherein said hold impedance means is connected to said caller's line to maintain said line in the hold condition, said hold impedance means being conducted to said caller's line during transmission of a stored instruction message to said held caller, during the sending by said held caller of program select command signals by said program select signalling means to said remote location, and during the transmission of the selected program over the held caller's line.

9. A system as recited in claim 5, wherein said program select means is responsive to said select signal decoding means for selecting different program source means after said held caller has received the initially selected program material, whereby said held caller can remotely select and receive the program source material from more than one of said program source means.

10. A system as recited in claim 5, further comprising line multiplexer means connected to serve a plurality of incoming lines in said system, a plurality of said holding circuits for accommodating said plurality of lines, common logic means connected to said program select means and said line multiplexer means, and said program select signalling means at each of a plurality of held caller's locations, whereby each of said held callers can remotely select and receive program material from said plurality of program source means.

11. A system for providing remote program selection by a held caller during the hold connection in a telephone hold program system wherein said held caller's line is connected to a holding circuit and a program is transmitted to the held caller, comprising:
 hold detection means for detecting when a line is being held by said holding circuit;
 program select signalling means, at said held caller's location, for sending select signals over said caller's line, when said line is being held, for selecting one of a plurality of programs to be played to said held caller;
 select signal decoding means for receiving and decoding said select signals sent by said held caller to select the particular program signalled by said held caller;
 a plurality of program source means;
 program select means, responsive to said select signal decoding means, and connected to said plurality of program source means, for selecting one of said plurality of program sources, determined by the select signal decoding means;
 hold program circuit means connected to said program select means for coupling the selected program source to said held caller's line during the period that the held caller is on hold; and
 hybrid circuit means connected between said holding circuit and said select signal decoding means and said program select means, to provide a transmission path from the said program select means to said held line and a transmission path from the said held line to said select signal decoding means, whereby the transmitted program from the said program select means will be cancelled and will not interfere with the operation of the said select signal decoding means.

12. A system as recited in claim 11, wherein said hybrid circuit means includes means for separating the outgoing transmitted program onto said held caller's line from the received select command signals.

13. A system as recited in claim 12, wherein said hybrid circuit means comprises a balanced bridge circuit having transformer windings on the bridge arms and a balanced impedance for matching the impedance of the held caller's line.

14. A system as recited in claim 13, wherein said hybrid circuit means comprises a balanced resistance bridge circuit with a balancing impedance for matching the impedance of the held caller's line.

15. A system for providing remote program selection to a plurality of caller's incoming lines in a telephone hold program system wherein a plurality of hold switch means are associated with telephone sets for placing incoming caller's lines on hold comprising:
 a plurality of telephone sets having receivers;
 a plurality of said hold switch means being activated for breaking an existing voice connection between an incoming line of a caller and said telephone receiver for holding said incoming line busy and connecting a program source to said held incoming line;
 program select signalling means, at said held callers' locations, for sending select signals over said caller's line, when said line is being held, for selecting one of a plurality of said programs;
 line multiplexer means connected to serve each of said caller's lines and said telephone sets;
 select signal decoding means for receiving and decoding said select signals sent by a held caller to select the particular program signalled by said held caller;
 a plurality of program source means comprising different programs;
 program select means, responsive to said select signal decoding means, and connected to said plurality of program source means, for selecting one of said plurality of program sources, determined by the select signal decoding means;
 hold program circuit means connected to said program select means, for coupling the selected program source to said held caller's line; and
 common logic means connected to said program select means and said line multiplexer means for enabling each of said held callers to remotely select and receive program material from said plurality of program source means;
whereby the held caller will receive the program source material which said held caller has selected remotely from said plurality of program sources.

16. A system as recited in claim 15, further comprising electronic remote volume control means connected between said program source means and said hold program circuit means, said volume control means being controlled by means for detecting a volume control command signal sent by said held caller, whereby said volume control command signal sent by said held caller will remotely control the volume level of the program supplied to said held caller.

17. A system as recited in claim 15, further comprising hold detection means for detecting when any of said caller's lines is being held by said holding circuit means.

18. A system as recited in claim 15, further comprising program select announcement means, coupled to each of said held lines, for transmitting instructions to said held caller for remotely selecting one of a plurality of programs.

19. A system as recited in claim 15, wherein said program select signalling means comprises a multifrequency dial generator.

20. A system as recited in claim 15, wherein said program select signalling means comprises the voice of said held caller which recites key words for producing said select signals.

21. A system as recited in claim 19, wherein said select signal decoding means comprises a tone decoder.

22. A system as recited in claim 15, further comprising common bus means for communicating between said telephone sets, said program sources, said select signal decoding means said program select means and said hold prgram circuit means.

23. A system as recited in claim 22, wherein computer means are connected to said common bus for carrying out said operations of said select signal decoding means, said program select means and said hold program circuit means for selecting said program sources for said held incoming lines via said common bus.

24. A system for providing remote program selection by a held caller during the hold connection in a telephone hold program system wherein a hold switch means is activated to break an existing voice connection between an incoming line of said caller and a telephone receiver and for holding said incoming line busy and connecting a program source to said held incoming line; comprising:
  said hold switch means;
  a plurality of program source means providing different audio programs for said hold program;
  program select signalling means, at said held caller's location, for sending select signals over said caller's line, when said line is being held, for selecting one of a plurality of said programs to be played to said held caller;
  select signal decoding means for receiving and decoding said select signals sent on said held line by said held caller to select the particular program signalled by said held caller; and
  hold program select means for coupling the selected program to said held caller's line during the period that the held caller is on hold;
whereby the held caller will receive the particular program which said held caller has selected remotely from said plurality of program source means.

25. A system as recited in claim 24 further comprising program select announcement means, responsive to said hold switch means, for transmitting instructions over said held line to said held caller for remotely selecting one of a plurality of programs.

26. A system as recited in claim 24, wherein said program select signalling means comprises a multifrequency dial set telephone set at said held caller's location.

27. A system as recited in claim 24, wherein said select signal decoding means comprises a tone decoder.

28. A system as recited in claim 24, wherein said hold program select means includes reset means for disconnecting said selected program from said held caller's line when said line is removed from hold.

29. A system as recited in claim 24, further comprising remote volume control means connected between said program source means and said hold program select means, said volume control means being controlled by means for detecting a volume control command signal sent by said held caller, whereby said volume control command signal sent by said held caller will remotely control the volume level of the program supplied to said held caller.

30. Method for providing remote program selection by a held caller during the hold connection in a telephone hold program system having a hold switch means which is activated to break an existing voice connection between an incoming line of said caller and a telephone receiver and for holding said incoming line busy and connecting a program source to said held incoming line; comprising:
  answering an incoming call;
  connecting said incoming line on hold;
  sending, from the location of said held caller while said held caller is connected on hold, select signals for selecting a particular one of a plurality of programs to be played back to said held caller from a receiving location where said incoming line was connected on hold;
  receiving, at said location where said incoming call was answered, said select signals and decoding said select signals;
  providing a plurality of different programs; and
  sending, in response to the decoded select signals, the particular program selected from said plurality of different programs;
whereby the held caller will receive the particular program which said held caller has selected remotely from said plurality of programs.

31. Method as recited in claim 30, further comprising:
  in response to connecting said incoming line on hold, connecting to said incoming held line and announcement message source for transmitting instructions to said held caller for remotely selecting one of said plurality of programs.

* * * * *